(12) United States Patent
Kalbfell et al.

(10) Patent No.: US 11,426,737 B2
(45) Date of Patent: Aug. 30, 2022

(54) WASTE DISPOSAL SYSTEM (71) Applicant: Siemens Healthcare Diagnostics Products GMBH, Marburg (DE)

(72) Inventors: Heiko Kalbfell, Taunusstein (DE); Joachim Bernhard, Karben (DE)

(73) Assignee: Siemens Healthcare Diagnostics Products GmbH, Marburg (DE)

( * ) Notice: Subject to any disclaimer, the term of this patent is extended or adjusted under 35 U.S.C. 154(b) by 265 days.

(21) Appl. No.: 16/791,800

(22) Filed: Feb. 14, 2020

(65) Prior Publication Data
US 2020/0269251 A1    Aug. 27, 2020

(30) Foreign Application Priority Data

Feb. 25, 2019 (EP) .................................... 19159163
Oct. 29, 2019 (EP) .................................... 19205784

(51) Int. Cl.
*B01L 9/00* (2006.01)
*B01L 1/00* (2006.01)
*B65G 11/02* (2006.01)
*B65G 11/20* (2006.01)
*G01N 35/00* (2006.01)

(52) U.S. Cl.
CPC .................. *B01L 9/543* (2013.01); *B01L 1/50* (2013.01); *B65G 11/023* (2013.01); *B65G 11/203* (2013.01); *G01N 35/0099* (2013.01); *B01L 2200/04* (2013.01); *B01L 2200/082* (2013.01); *B01L 2200/18* (2013.01); *B01L 2300/046* (2013.01); *B01L 2300/0832* (2013.01);

(Continued)

(58) Field of Classification Search
None
See application file for complete search history.

(56) References Cited

U.S. PATENT DOCUMENTS 2,650,464 A * 9/1953 Bernheim ............ A01D 46/247
53/391
3,934,691 A * 1/1976 Toloczko ............... B65D 90/54
62/266

(Continued)

FOREIGN PATENT DOCUMENTS

EP    2308588 A2    10/2012
EP    3100698 A1    12/2015

(Continued)

*Primary Examiner* — Matthew D Krcha
(74) *Attorney, Agent, or Firm* — Dugan & Dugan, PC (57) ABSTRACT A waste disposal system for the disposal of consumables through a waste chute into a waste container includes a waste chute having a first opening and a second opening, wherein the first opening is situated outside the waste container and the second opening opens toward the waste container. The first opening and the second opening are arranged at a first distance from one another, wherein the waste chute includes a plurality of self-resetting lamellae for the partial or complete closure of the openings. The lamellae form at least two lamella annuli arranged at a second distance above one another, wherein at least one first lamella annulus closes the first opening and at least one second lamella annulus closes the second opening, and the second distance between the lamella annuli is at least one third, preferably at least half and particularly preferably at least three quarters of the first distance.

16 Claims, 4 Drawing Sheets (52) U.S. Cl.
CPC .................. *B01L 2300/123* (2013.01); *G01N 2035/00277* (2013.01)

(56) References Cited

U.S. PATENT DOCUMENTS

| | | |
|---|---|---|
| 4,893,722 A | 1/1990 | Jones |
| 2007/0068832 A1 | 3/2007 | Anderson et al. |
| 2011/0086432 A1 | 4/2011 | Herz et al. |
| 2011/0091292 A1* | 4/2011 | Bryan, Jr. .............. B65G 69/16 406/197 |

FOREIGN PATENT DOCUMENTS

| | | | | |
|---|---|---|---|---|
| EP | 3100698 A1 * | 12/2016 | ............. | A61B 50/20 |
| JP | H07178136 A | 7/1995 | | |
| JP | 201553321 A | 11/2015 | | |
| JP | 2016224048 A | 12/2016 | | |
| JP | 2018112439 A | 7/2018 | | |
| WO | WO201406281 | 4/2014 | | |

\* cited by examiner

FIG 9 ental methods for determining physiological parameters in body fluid samples or other biological samples are carried out today in an automated manner in a large number in automatic analytical instruments, including so-called in vitro diagnostic systems.

WASTE DISPOSAL SYSTEM

CROSS REFERENCE TO RELATED APPLICATIONS

This claims priority to European Patent Application No. EP 19159163.5, filed Feb. 25, 2019, and European Patent Application No. EP 19205784.2, filed Oct. 29, 2019, each of which is hereby incorporated by reference herein in its entirety for all purposes.

FIELD

The invention relates to a waste disposal system for an automatically operating analyzer and is in the technical field of automatic analytical instruments.

BACKGROUND

Numerous detection and analytical methods for determining physiological parameters in body fluid samples or other biological samples are carried out today in an automated manner in a large number in automatic analytical instruments, including so-called in vitro diagnostic systems.

Analytical instruments of today are capable of carrying out a multiplicity of detection reactions and analyses with one sample. To be able to carry out a multiplicity of tests in an automated manner, what are required are various devices for the spatial transfer of measurement cells, reaction containers and reagent containers, such as, for example, transfer arms with gripping function, conveyor belts or rotatable transport wheels, and also devices for the transfer of liquids, such as, for example, pipetting devices. The instruments comprise a control unit which, by means of appropriate software, is capable of planning and performing the work steps for the desired analyses in a largely independent manner.

Many of the analytical methods used in such automatically operating analytical instruments are based on optical methods. Such methods allow the qualitative and quantitative detection of analytes, i.e., of the substances in samples that are to be detected or determined. In many cases, clinically relevant parameters, such as, for example, the concentration or activity of an analyte, are determined by mixing a portion of a sample with one or more test reagents in a reaction vessel, which can also be the measurement cell, this resulting in, for example, the initiation of a biochemical reaction or a specific binding reaction which brings about a measurable change in an optical or other physical property of the test mix.

It is known that, in automatically operating analyzers used for testing biological body fluids, the required reagents are filled into a measurement cuvette by means of a pipetting device having a pipetting needle. The measurement cuvette is then automatically moved to various positions within the automatic analytical instrument using a cuvette gripper by means of a robot arm which is part of a robot station. After the measurement, the used measurement cuvette is disposed of through a waste chute into a waste container. In many cases, the used cuvette still contains liquid. The liquid present in the cuvette must not spurt out of the cuvette and contaminate the analyzer.

For disposal through the waste chute into the waste container, the measurement cuvette is moved to the waste chute and disposed of there into using the cuvette gripper. In this process, there is the risk of liquid present in the used cuvettes spurting out of the cuvettes and contaminating the analyzer. Furthermore, the risk of contamination for personnel operating the analytical instrument is considerable.

EP 2308588 A2 discloses various gripping systems and grippers for cuvettes, examples of which have a one-piece and elastically deformable design and function in a passive manner. Other grippers have a multi-piece design and can execute gripping movements in an active manner.

For example, the measurement cuvette is handed over at the waste chute from the cuvette gripper to a further gripper which is designed as a multi-piece electric gripper and can execute gripping movements in an active manner. The empty cuvette gripper can be moved further in order to process the next measurement cuvette. The electric gripper is opened above the waste pipe by means of control software, and the used cuvette falls through the waste chute into the waste container. This leads to the disposal of used measurement cuvettes being comparatively complicated, time-consuming and error-prone. This particularly applies to the handover of the measurement cuvette to the electric gripper and also to the electric gripper itself. This leads to relatively high expenditure in terms of costs and time and considerably increases the error-proneness in performing an analysis in an automatic analytical instrument.

EP 3100698 A1 discloses a waste disposal system for the disposal of consumables through a waste chute into a waste container, the waste disposal system comprising a waste chute having an opening, the waste chute comprising a plurality of lamellae for the partial or complete closure of the opening. The waste disposal system has numerous technical advantages, but what can occur, particularly in the interior of the waste chute, is soiling due to, for example, liquids which are still present in the consumables. This can considerably increase the risk of contamination for laboratory personnel. Furthermore, this can reduce the service life of the components of the waste disposal system and, in particular, of the waste chute and also the waste container and make an early replacement necessary. Besides high costs for service personnel and replacement parts, this also means that the availability of the analytical systems is reduced and the error-proneness is increased.

Furthermore, EP 3100698 A1 discloses a waste disposal system in which the lamellae form a multiplicity of lamella annuli which are arranged above one another and which extend over the entire length of the waste chute as far as the waste container. Although this can reduce the soiling of the waste chute in part, the force required for pushing consumables through the waste chute from top to bottom through the numerous lamella annuli is very high, meaning that the required force cannot be exerted by conventional cuvette grippers.

Similar problems as in the case of the cuvettes also arise in the case of other consumables such as, for example, exchangeable pipette tips.

SUMMARY OF THE INVENTION

It is therefore an object of the invention to provide an improved waste disposal system which reduces the risk of contamination for personnel operating or servicing the analytical instrument. A further aim is to achieve a reduction in expenditure in terms of costs and time and a lower error-proneness in an automatic analytical instrument. A simultaneous aim is to increase the service life of the components of the waste disposal system and, in particular, of the waste chute and also the waste container and to avoid an early replacement of the components. A further aim is to make it possible for the waste disposal system to be able to dispose of consumables through the waste chute into the waste container by means of a conventional cuvette gripper and without excessive exertion of force.

This object is achieved according to the invention by the subjects and methods described herein below.

It has been found that an improved waste disposal system can be achieved when a plurality of lamellae for the partial or complete closure of openings of the waste chute are provided, wherein lamellae form lamella annuli in the region of a first opening and in the region of a second opening of the waste chute and wherein the distance between the lamella annuli is at least one third of the distance corresponding to the length of the waste chute between the first and second opening thereof.

This has the advantage that the force required for pushing consumables through the waste chute from top to bottom through the lamella annuli is comparatively low and that there is simultaneous prevention of the consumables falling through the waste chute into the waste container in an uncontrollable manner and heavily contaminating particularly the waste chute while doing so as a result of liquids escaping from the consumables. The arrangement according to the invention of the lamella annuli means that the consumables are piled up in the interior of the waste chute and, when the waste chute is full, are individually pushed downward into the waste container through the lamella annulus in the region of the second opening of the waste chute. The force required to this end is sufficiently low for it to be able to be exerted by means of conventional cuvette grippers in automatic analytical instruments. Furthermore, the risk of contamination for personnel operating or servicing the analytical instrument is reduced. Furthermore, a reduction in expenditure in terms of costs and time and a lower error-proneness in an automatic analytical instrument is achieved. At the same time, the service life of the components of the waste disposal system and, in particular, of the waste chute and also the waste container is increased and an early replacement of the components is avoided.

Furthermore, this has the advantage that the lamellae can replace additional mechanical and electric components, such as, for example, an electric gripper, and electrically moved parts can thus be saved. This allows a reduction in expenditure in terms of costs and time and a lower error-proneness in performing an analysis in an automatic analytical instrument.

The present invention provides, in particular, a waste disposal system for the disposal of consumables through a waste chute into a waste container, the waste disposal system comprising a waste chute having a first opening and a second opening, wherein the first opening is situated outside the waste container and wherein the second opening opens toward the waste container, wherein the first opening and the second opening are arranged at a first distance from one another, wherein the waste chute comprises a plurality of self-resetting lamellae for the partial or complete closure of the openings, wherein the lamellae form at least two lamella annuli arranged at a second distance above one another, wherein at least one first lamella annulus closes the first opening and wherein at least one second lamella annulus closes the second opening, wherein the second distance between the lamella annuli is at least one third, preferably at least half and particularly preferably at least three quarters of the first distance.

In a further advantageous embodiment, the second distance is identical to the first distance, i.e., the magnitude of the first distance is identical to the magnitude of the second distance.

The second lamella annulus acts, then, as a brake for consumables that prevents consumables, such as, for example, cuvettes, from falling out in an uncontrolled manner. The first consumable introduced above through the first opening into the waste chute initially remains inserted in the first lamella ring. The following consumable shunts the first consumable through the first lamella ring and the first consumable falls through the waste chute as far as the second lamella ring. With each further consumable introduced from above through the first opening, the consumables pile up in the waste chute until it is completely filled with consumables. If, then, a further consumable is introduced through the first opening, the first consumable situated in the region of the second lamella ring at the lower end of the waste chute is pushed through the second lamella ring and falls into the waste container. Without the second lamella ring, which acts as a brake, each consumable would fall through the entire waste chute in an uncontrolled manner. Preferably, the resistance exerted on the consumables by the second lamella ring is tailored such that the consumables, firstly, can be easily actively shunted through the brake and, secondly, provide sufficient resistance for consumables not to fall through from above without active shunting simply on the basis of their own weight in the Earth's gravitational field. In contrast to a waste drop-chute having lamellae, a tube or the like over the entire length of the waste chute, the localization of the braking and holding action of the second lamella ring at the lower end of the waste chute means that it is possible to reduce the overall necessary force for pushing consumables piled up in the waste chute through the waste chute into the waste container. As a result of this, the length of the waste chute can be extended and, even in the case of an extended waste chute, the consumables can be pushed through the waste chute into the waste container in an automatic analytical instrument with comparatively low exertion of force by means of, for example, a conventional cuvette gripper. At the same time, the consumables do not fall through the waste chute in an uncontrolled manner, and this means that the contamination of the waste chute and the waste container by, for example, residual liquid escaping from the consumables is accordingly reduced. This in turn can lead to extended life cycles of the waste chute and/or the waste container. The availability of the analytical systems is increased and the error-proneness is reduced.

In a preferred embodiment, no lamellae and/or lamella annuli are arranged between the first lamella annulus and the second lamella annulus. This means that the overall necessary force for pushing consumables piled up in the waste chute through the waste chute into the waste container can be further minimized.

In a further preferred embodiment, the plurality of lamellae for the partial or complete closure of the opening is connected to the waste chute.

In a preferred embodiment, the first lamella annulus which closes the first opening is arranged immediately in the region of the first opening and/or at the first opening. Preferably, no further lamellae and/or lamella annuli are arranged between the first lamella annulus and the first opening.

In a preferred embodiment, the second lamella annulus which closes the second opening is arranged immediately in the region of the second opening and/or at the second opening. Preferably, no further lamellae and/or lamella annuli are arranged between the second lamella annulus and the second opening.

In a preferred embodiment, the waste chute comprises no further lamellae and/or lamella annuli except the lamellae of the first and/or second lamella annulus.

Preferably, the waste chute is at least as long as the longest extent of the consumables, particularly preferably at least three times as long as the longest extent of the consumables. This means that the consumables do not immediately fall into the waste container, but are initially completely situated in the waste chute and fall from the waste chute into the waste container in a controlled manner. Furthermore, this means that there is a certain spatial separation between the opening of the waste chute and the waste container. This has the advantage that liquid which may still be present in the consumables and which will escape from the consumables in the waste container cannot pass beyond the waste chute, by outward spurting for example, or only to a reduced extent. This can, for example, reduce the risk of contamination of operating and service personnel.

Preferably, the cross section of the waste chute is larger than the smallest extent and smaller than the largest extent of the consumables. For example, in the case of measurement cuvettes having a cylindrical shape with a height and a diameter, the height being greater than the diameter, the cross section of the waste chute is thus preferably larger than the diameter and smaller than the height of the measurement cuvettes. This has the advantage that the consumables can pass through the waste chute only in a certain orientation. Thus, what is achieved for example is that liquid which may still be present in the consumables escapes from the consumables only in the waste container and not as early as within the waste chute. This can, for example, further reduce the risk of contamination of operating and service personnel.

Preferably, the waste chute has a first inner diameter in the region of the lamella annuli and the waste chute has a second inner diameter in the region between the first lamella annulus and the second lamella annulus, wherein the second inner diameter is smaller than the first inner diameter. This means that consumables, particularly cuvettes, do not tip and become wedged inside one another as a result and clog or soil the waste chute, for example, by escaping residual liquids. The narrow cross section in the region between the lamella rings means that the consumables are guided geometrically through the waste chute. This minimizes wobbling movements of the consumables in the waste chute and avoids resultant splashes from, for example, residual liquid in the consumables.

Preferably, the waste disposal system further comprises a ramp for the diversion of consumables, wherein the ramp is arranged below the second opening, with the result that consumables falling through the second opening into the waste container fall onto the ramp and are diverted thereby.

This has the advantage that, if the consumables cannot fall directly into the waste container, they can be redirected by a ramp. The path from the second opening serving as drop opening of the waste chute should remain clear and should not be clogged by consumables, since, for example, the analytical instrument cannot otherwise be further operated.

Preferably, the ramp is rectangular in its cross section with rounded corners. Preferably, the ramp comprises sidewalls, wherein the sidewalls are sloping in the cross section of the ramp.

This has the advantage that a blockage of the ramp can be reliably avoided. The liquids present in the consumables are frequently of a sticky consistency, meaning that residues of the liquids in the interior of the waste chute and/or on the ramp can lead to a blockage of the waste chute and/or the ramp. For example, liquid can undesirably escape from the consumables when it experiences an impulse such as, for instance, when striking a diversion ramp. In this connection, the shape of the ramp has an influence on the occurrence of splashes. For example, if the total width of the cross section of the ramp is larger than the longest extent of the consumables, for example, cuvette height in the case of elongated and cylindrical cuvettes, the cuvette can position itself transversely or rotate in the region of the ramp, and this can lead to the escape of liquid. Therefore, the corners are advantageously rounded with a relatively large radius and the width of the ramp is reduced by sloping sidewalls. The result of this is that, although the consumables, for example cuvettes, have movement clearance for reducing motion energy present after falling due to rolling and wobbling movements, the movement clearance is restricted to the extent that tipping and rotating movements of the cuvette, which can lead to liquid loss, are minimized. Straight surfaces, or surfaces with which the cuvette can collide, are also avoided. Thus, blocking of the ramp, particularly as a result of escape of sticky liquid from the consumables, can be effectively avoided more reliably.

Preferably, the consumables are cuvettes, particularly measurement cuvettes, or pipette tips.

Preferably, the consumables are furthermore products which are used only once and then discarded or replaced.

For example, the first used measurement cuvette is moved to the first opening of the waste chute, where it is inserted between the lamellae of the first lamella ring by means of the cuvette gripper. The lamellae are oriented such that they exert a force on the measurement cuvette and firmly hold it, with the result that the used measurement cuvette does not fall into the waste chute. The empty cuvette gripper can, for example, be moved further in order to process the next measurement cuvette.

The lamellae are, in this connection, advantageously oriented and designed such that they restrict the movement of the measurement cuvette such that liquid is prevented from spurting out of the cuvette. Furthermore, the lamellae advantageously consist of an elastic material and/or are connected elastically to the waste chute in order to attenuate speed increases of the measurement cuvette that may occur upon contact of the measurement cuvette with the lamellae and to thus prevent liquid from spurting out of the cuvette even if speed increases of the measurement cuvette occur.

A second used measurement cuvette is then correspondingly placed onto the first used measurement cuvette. At the same time, the cuvette gripper pushes the first used measurement cuvette downward with the second used measurement cuvette further into the first opening of the waste chute in a perpendicular manner. Further used measurement cuvettes are moved correspondingly. If, then, one of the used measurement cuvettes is pushed sufficiently deeply into the opening of the waste chute, the measurement cuvette is released from the lamellae and falls as far as the second lamella ring in the region of the second opening of the waste chute. If further measurement cuvettes are correspondingly disposed of through the first opening into the waste chute, the measurement cuvettes pile up on top of one another in the interior of the waste chute until the waste chute is filled with measurement cuvettes. If further measurement cuvettes are then disposed of through the first opening into the waste chute, the lowest measurement cuvette, which is initially firmly held by the second lamella ring, is pushed through the second lamella ring and the measurement cuvette falls into the waste container. The other measurement cuvettes situated in the waste chute are, at the same, correspondingly pushed further downward in a controlled manner.

Preferably, the lamellae are sufficiently elastic in order to prevent the lamellae which are springing back and which have released the lowest measurement cuvette from striking against the cuvette situated there above, since this might otherwise lead to liquid spurting out of the cuvette.

What can be achieved by means of the design of the lamellae of the first lamella ring is that, simply by means of the second used measurement cuvette, the first used measurement cuvette is pushed sufficiently deeply into the opening of the waste chute in order to be released from the lamellae and to fall as far as the second lamella ring. Alternatively, the lamellae can be designed such that three or more used measurement cuvettes must be placed onto the first used measurement cuvette before it is released from the lamellae and falls as far as the second lamella ring. In this connection, the appropriate design of the lamellae encompasses, for example, their size, shape and/or arrangement.

Advantageously, the first and the second lamella annulus are similar in design. For example, this has advantages especially also when the lamella annuli are designed as lamella inserts and thus only one type of lamella annulus or lamella insert has to be developed and/or manufactured.

Advantageously, a waste disposal system according to the invention comprises a waste chute, a waste container and a holder for the waste chute, wherein cuvettes can be disposed of through the waste chute into the waste container and the waste chute can be fixed to the waste container by means of the holder.

Furthermore, the waste disposal system advantageously comprises a robot station having an automatically moveable transfer arm having a cuvette gripper for the movement of cuvettes within the action zone of the automatically moveable transfer arm.

Advantageously, the waste chute and the waste container are arranged in the Earth's gravitational field such that a cuvette can be disposed of through the first opening of the waste chute into the waste chute and then falls downward through the waste chute as far as the second lamella ring as a result of gravity or falls through the second lamella ring into the waste container after being pushed through.

Advantageously, the waste disposal system comprises at least one injection-molded part made of plastic.

Advantageously, the waste chute, the waste container, the cuvette gripper and/or the lamella insert are each an injection-molded part made of plastic. Alternatively, the components can advantageously be produced by means of 3D printing. This may be particularly advantageous especially also for relatively small replacement parts, such as, for example, a lamella ring.

Advantageously, the waste chute and the lamella rings are produced by means of 3D printing, preferably in a single printing operation or spread over multiple printing operations.

Advantageously, the waste chute is particularly stable, and the lamellae are elastic. This has the advantage that speed-increasing forces on the measurement cuvettes are avoided or at least minimized.

In an advantageous design, the lamellae consist of plastic and/or rubber. This allows a particularly inexpensive manufacture of the lamellae using customary production methods. In a further advantageous design, the lamellae consist of metal, for example, copper, steel and aluminum.

Advantageously, the lamellae comprise leaf springs or the lamellae are designed as leaf springs. At the same time, the leaf springs can, for example, be connected to the waste chute or be an immediate part of the waste chute.

Advantageously, the lamellae are made from the same material as the waste chute. This is particularly advantageous when producing waste chutes as 3D printed parts.

Advantageously, the lamellae comprise spiral springs or the lamellae are designed as spiral springs.

Advantageously, the lamellae comprise foam or the lamellae consist of foam. Advantageously, the foam is open-cell or closed-cell. The use of closed-cell foam is also particularly advantageous because of the resetting properties. Preferably, the foam comprises or consists of expanded polypropylene (EPP).

Advantageously, the lamella annuli are designed as a closed ring which initially firmly holds consumables and through which the consumables can be shunted. This is particularly advantageous when the lamellae consist of foam or some other soft material. Preferably, the first and/or second lamella annulus is/are, then, designed as a closed ring.

In a further advantageous embodiment, the lamella annuli are designed as a ring or funnel having a slit in the direction of the disposal of the consumables, meaning that a consumable, for example a cuvette, should accordingly expand the funnel or ring when the consumable is pushed through the funnel or ring. This has the advantage that such a funnel can be integrated particularly well in the waste chute.

Advantageously, the lamellae comprise or consist of brushes. Advantageously, the lamella annuli comprise or consist of one or more brush rings.

Advantageously, the first and/or the second lamella annulus is/are designed as an elastic narrowing of the waste chute. In this connection, the narrowing is designed such that the consumables can be appropriately pushed through the narrowing. Preferably, the elastic narrowing comprises openings in a wall of the waste chute, the openings preferably being designed as longitudinal slits. In this connection, the longitudinal slits are preferably arranged in parallel to the direction of disposal of the consumables through the waste chute.

Advantageously, the lamellae comprise or consist of spheres which are pushed within a holder in its resting position by means of one or more springs in the direction of the central axis of the waste chute. Preferably, the springs comprise or consist of a spiral spring.

In a further advantageous design, the lamellae forming the lamella rings are separably connected to the waste chute, for example, by wedging the lamellae into the waste chute, by means of an adhesive bond and/or a screw connection. This has the advantage that the lamellae can, for example in the case of wear and tear, be replaced simply and cost-effectively without the waste chute or further parts of the waste disposal system having to be replaced as well. This can also lead to considerable cost savings.

In a preferred embodiment, the lamellae are connected to one another and form a lamella insert which can be fixed to the waste chute as one part. This considerably simplifies the attachment and replacement of the lamellae, since only one lamella insert needs to be handled and not a multiplicity of individual lamellae.

In a preferred embodiment, the lamellae are directed inward in a radial manner in the cross section of the waste chute. This has the advantage that the lamella insert can be manufactured particularly simply and cost-effectively. Furthermore, the function of the lamella insert is independent of the radial orientation of the lamella insert on the opening of the waste chute. This may be advantageous particularly in the case of cuvettes having an angular cross section, since such cuvettes can then be inserted into the lamella insert independently of their orientation relative to the waste chute or the lamella insert and a complicated orientation can be omitted.

In a further preferred embodiment, the lamella insert comprises at least one lamella annulus. This has the advantage that the lamella insert can be produced simply and cost-effectively. Furthermore, the lamella insert can thus be manufactured as one piece in a particularly simple manner, and this allows a particularly simple and cost-effective production and assembly/disassembly. This is of particular importance when the lamella insert is designed as a wear-and-tear part and should be replaced regularly. Furthermore, cuvettes are firmly held by a lamella annulus particularly reliably, and tipping of the measurement cuvette can be prevented, which could otherwise lead to fluid running out of the measurement cuvette. A lamella annulus is also presently referred to as a lamella ring.

In a particularly preferred embodiment, the lamella insert comprises at least two lamella annuli arranged above one another. This has the advantage that cuvettes are firmly held particularly reliably. In particular, the cuvettes are held by the lamella annuli in a perpendicular position and are not positioned in a tilted manner. This particularly reliably avoids liquid being able to accidentally escape from a used cuvette.

In a further preferred embodiment, the lamellae of lamella annuli adjacent to one another are offset relative to one another. This has the advantage that cuvettes can be inserted into the lamella annuli in a particularly easy and less error-prone manner. Furthermore, the cuvettes are, upon insertion into the lamella annuli, oriented and centered particularly accurately with respect to the lamella annuli. This allows a particularly reliable disposal of the cuvettes through the waste chute into the waste container.

Preferably, the waste chute is designed as a pipe. Preferably, the pipe is designed as a straight pipe. Preferably, the pipe is rigid and/or inflexible. In a further preferred embodiment, the waste chute is designed as a curved pipe. In a further preferred embodiment, the waste chute is designed as a tube, preferably as a flexible tube.

In a further preferred embodiment, the opening of the waste chute has a round, oval, square, rectangular or polygonal cross section. This has the advantage that the shape of the cross section of the opening can be tailored to the cross section of the cuvettes. This allows a particularly simple and reliable disposal of the cuvettes through the waste chute into the waste container. Furthermore, the waste chute can thus be designed in a particularly space-saving manner, and this may be particularly advantageous in automatic analytical instruments.

In another preferred embodiment, the waste chute comprises, in the region of the opening, an opening mechanism for a cuvette gripper. If a measurement cuvette is moved by means of a cuvette gripper to the opening of the waste chute, where it is inserted into the lamellae by means of the cuvette gripper, the opening mechanism simultaneously opens the cuvette gripper, with the result that the cuvette gripper releases the cuvette and can be moved further without the cuvette in order to process further cuvettes. This has the advantage that, firstly, cuvettes are firmly connected to the cuvette gripper when moved and, secondly, they are released by the cuvette gripper in the opening of the waste chute without relatively great additional effort.

In a further preferred embodiment, the opening mechanism comprises a structure for opening a cuvette gripper, which structure is similar in shape to a prism having a triangle as base and top surface. This has the advantage that the opening mechanism can be implemented particularly simply and cost-effectively. Furthermore, this design is particularly advantageous in combination with a cuvette gripper which has been manufactured as one piece and which can be pushed apart particularly easily and efficiently by the triangular structure in order to release the cuvette.

In a preferred embodiment of the invention, the waste disposal system comprises a tube having a first and a second end instead of the second lamella annulus, wherein the first end of the tube is attached to the waste chute in the region of the second opening and wherein the second end is situated within the waste container.

Preferably, the tube is a mesh tube, an elastic grommet and/or a star tube.

Preferably, the tube is sufficiently stretchable in order, firstly, to be able to securely hold a consumable and, secondly, to allow a further sliding of the consumable within the tube when further consumables are subsequently pushed. For example, the tube is a mesh tube, fabric tube and/or a tube having a star-shaped cross section. This has the advantage that the consumables are guided by the tube and do not fall through the waste chute under the force of gravity in an uncontrolled manner. This can avoid a contamination of the interior of the waste chute, for example, by liquid present in and/or on consumables. This means that the waste chute has to be cleaned and/or replaced less frequently or not at all. A further advantage is that the consumables cannot become wedged or stuck together in the waste chute in an uncontrolled manner and thus blocking of the waste chute by consumables is reliably avoided.

Preferably, the second end of the tube extends into the waste container. This has the advantage that the consumables fall down under the force of gravity only in the waste container and, as a result, soiling of the waste chute is avoided, including in the part adjacent to the waste container.

In a further preferred embodiment of the invention, the waste disposal system comprises a self-closing flap instead of the second lamella annulus, wherein the flap preferably comprises a living hinge, and wherein the flap is attached to the waste chute in the region of the second opening and closes the second opening. This has the advantage that, by means of a flap as brake for the consumables, the direction of falling of the consumables during and/or after passage through the second opening of the waste chute can be influenced by a partially or completely open flap, since the consumables are accordingly deflected by the open flap.

Preferably, the lamellae or lamella rings have different elastic properties. For example, it may be advantageous for the lamellae or lamella rings in the region of the first opening of the waste chute to be firmer and less elastic than the lamellae or lamella rings which are situated in the waste chute in the region of the second opening closer to the waste container and which are softer. This has the advantage that the consumables are securely held by the firmer lamellae and can be more easily pushed further in the direction of the waste container through the softer lamellae.

Preferably, a waste disposal system according to the invention is suitable for an automatic analytical instrument.

The invention additionally provides a waste container together with an abovementioned waste disposal system according to the invention. This has the advantage that the used cuvettes can be collected in the waste container and can be directed to further discarding or recycling in a raw-material cycle.

The invention additionally provides a holder for an abovementioned waste chute according to the invention. The holder is connected to a waste container and makes it possible to establish a separable connection between the waste chute and the waste container. Preferably, the separable connection is a plug connection which can be established and separated manually without use of a tool. This has the advantage that the waste chute can be mounted and dismounted particularly easily and rapidly. This also leads to considerable cost advantages.

In a particularly advantageous design, the plug connection between holder and waste chute is locked by a rotation of the waste chute. This has the advantage that the separable connection between holder and waste chute can be established and separated in a particularly simple and less error-prone manner.

Preferably, the waste disposal system according to the invention is suitable for use in an automatic analytical instrument.

The invention additionally provides an analytical instrument comprising an abovementioned waste disposal system according to the invention. Advantageously, the analytical instrument further comprises at least one pipetting unit and at least one measurement device for the optical and/or electronic quantitative detection of at least one analyte in a sample.

The invention further provides for the use of a waste disposal system according to the invention for the disposal of cuvettes through a waste chute into a waste container for cuvettes.

The invention further provides for the use of a waste disposal system according to the invention in an automatic analytical instrument for the disposal of cuvettes through a waste chute into a waste container for cuvettes.

The invention further provides a method for disposing of cuvettes into a waste container in an automatic analytical instrument according to the invention comprising a cuvette gripper, wherein the cuvette gripper moves the cuvette to the opening of the waste chute.

In the context of the invention, a "sample" is to be understood to mean the material which is likely to contain the substance to be detected (the analyte). The term "sample" encompasses, in particular, biological fluids from humans or animals, such as, for example, blood, plasma, serum, sputum, exudate, bronchoalveolar lavage fluid, lymph, synovial fluid, semen, vaginal mucus, feces, urine and cerebrospinal fluid, but also, for example, tissue or cell culture samples appropriately processed by homogenization or cell lysis for photometric determination, preferably nephelometric determination. Furthermore, the sample used can also be, for example, plant fluids or tissue, forensic samples, water and wastewater samples, foodstuffs and medicaments, which, if necessary, can be subjected to an appropriate sample pretreatment prior to determination.

In the case of a quantitative detection, what is measured is the amount, the concentration or the activity of the analyte in the sample. The term "quantitative detection" also encompasses semiquantitative methods which capture only the approximate amount, concentration or activity of the analyte in the sample or can be used to specify only a relative amount, concentration or activity. A qualitative detection is to be understood to mean the detection of whether the analyte is present at all in the sample or the indication that the amount, concentration or activity of the analyte in the sample is below or above one or more certain thresholds.

A measurement cuvette is, for example, a cuvette or a reaction vessel composed of glass, plastic or metal. Advantageously, the measurement cuvette is made from optically transparent materials, and this may be advantageous particularly when using optical analytical methods.

The terms "measurement cuvette" and "cuvette" are used synonymously.

BRIEF DESCRIPTION OF THE DRAWINGS

The invention will be more particularly elucidated exemplarily on the basis of drawings, where.

Identical parts are provided with the same reference signs in all the figures.

DETAILED DESCRIPTION OF THE INVENTION

Figure 1:
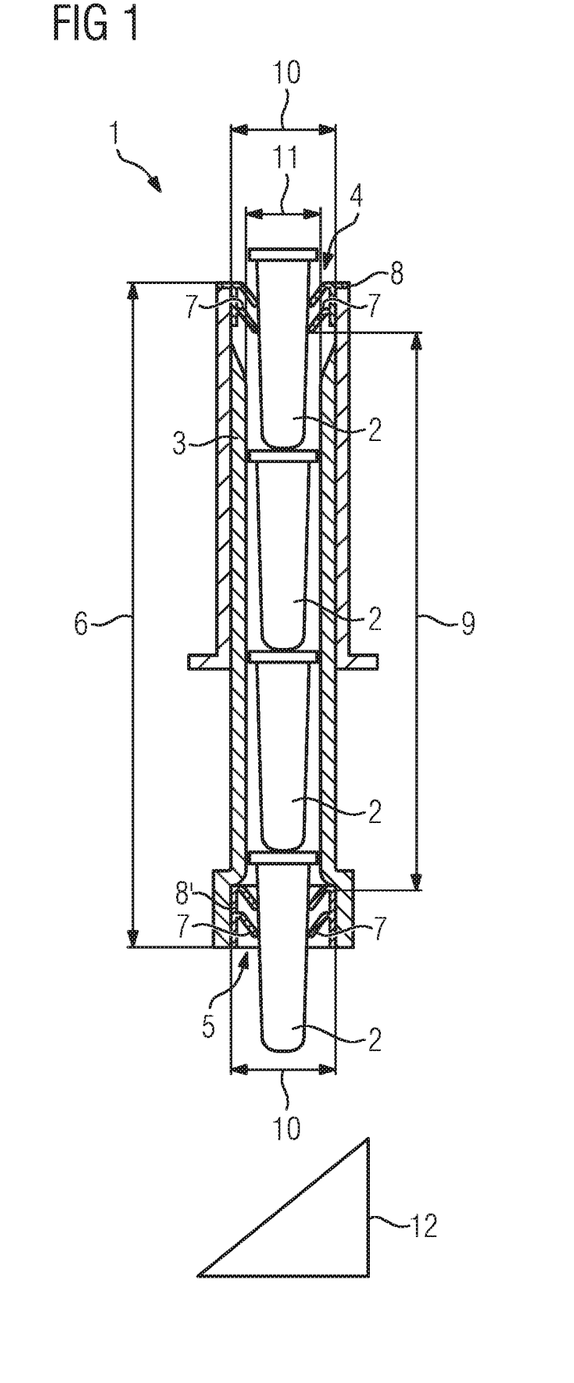
FIG. 1 shows schematically the structure of a waste disposal system (1) comprising a waste chute having a first and a second lamella annulus.

The waste disposal system (1) as per FIG. 1 is incorporated in an analytical instrument designed to execute a multiplicity of sample analyses, which analytical instrument is not depicted in detail. To this end, the automatic analytical instrument comprises a multiplicity of pipetting devices and transport devices, which are not shown, and also additionally a control unit for the automated evaluation of the analyses.

The waste disposal system (1) is designed to dispose of consumables, such as, for example, cuvettes (2), through a waste chute (3) into a waste container and comprises a waste chute (3) having a first opening (4) and a second opening (5), wherein the first opening (4) is situated outside the waste container and wherein the second opening (5) opens toward the waste container, wherein the first opening (4) and the second opening (5) are arranged at a first distance (6) from one another, wherein the waste chute (3) comprises a plurality of self-resetting lamellae (7) for the partial or complete closure of the openings (4, 5), wherein the lamellae (7) form at least two lamella annuli (8, 8') arranged at a second distance (9) above one another, wherein at least one first lamella annulus (8) closes the first opening (4) and wherein at least one second lamella annulus (8') closes the second opening (5), wherein the second distance (9) between the lamella annuli is at least one third, preferably at least half and particularly preferably at least three quarters of the first distance (6).

Advantageously, the first distance (6) is, in this connection, at least 90 mm and the second distance (9) at least 60 mm. Advantageously, a cuvette has, for example, dimensions of about 30 mm in height and 10 mm in outer diameter.

No lamella annuli are arranged between the first lamella annulus (8) and the second lamella annulus (8').

The waste chute (3) has a first inner diameter (10) in the region of the lamella annuli (8, 8') and a second inner diameter (11) in the region between the first lamella annulus (8) and the second lamella annulus (8'), wherein the second inner diameter (11) is smaller than the first inner diameter (10).

The waste disposal system (1) further comprises a ramp (12) for the diversion of cuvettes (2), wherein the ramp (12) is arranged below the second opening (5), with the result that consumables (2) falling through the second opening (5) into the waste container fall onto the ramp (12) and are diverted thereby.

Advantageously, the ramp comprises sidewalls and is rectangular in its cross section with rounded corners and sloping sidewalls (not depicted).

In the interior of the waste chute (3), the cross section thereof is thus reduced to the extent that cuvettes (2) cannot tip and thus cannot become wedged in the waste chute (3). At the lower end of the waste chute (3), the second lamella annulus (8') acts as a cuvette brake which prevents cuvettes from falling out of the waste chute (3). The first cuvette (2) introduced above into the waste chute (3) initially remains inserted in the first lamella annulus (8). The following cuvette (2) shunts the first cuvette (2) through the first lamella annulus (8), with the result that it falls as far as the second lamella annulus (8'), where it is braked. The narrowed cross section means that the cuvette is guided geometrically, with the result that wobbling and thus splashes due to wobbling are minimized. With each further cuvette (2) introduced above, the cuvettes (2) pile up in the waste chute (3) until it is filled with cuvettes (2). If, then, a further cuvette (2) is introduced above, the lowest cuvette (2) is pushed through the second lamella annulus (8') as a result and falls downward into the waste container or onto the ramp in the waste container. Without the second lamella annulus (8'), each cuvette (2) would fall over the entire length of the waste chute (3) under the influence of the Earth's gravitational field. The frictional resistance of the second lamella annulus (8') is thus tailored such that the cuvettes (2) can be actively shunted through the lamella annulus (8'), but provides sufficient resistance to prevent the cuvettes from falling through on their own. In contrast to a waste chute (3) having, for example, lamellae, lamella rings or a tube on the entire length of the waste chute (3), the localized braking and holding action at the lower end of the waste chute (3) makes it possible to minimize the resultant friction upon introduction of the cuvettes (2) at the upper end. This makes it possible to maximize the entire length of the waste chute (3) while simultaneously minimizing the force required for the introduction of the cuvettes (2).

Figure 2:
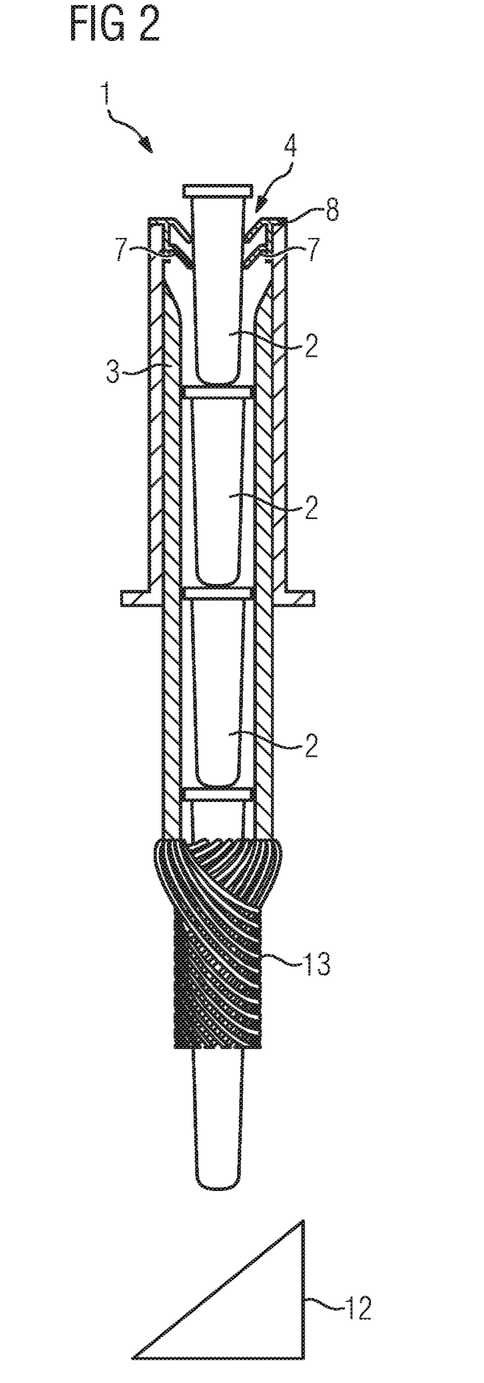
FIG. 2 shows schematically the structure of a waste disposal system (1) comprising a waste chute having a first lamella annulus and a mesh tube as a brake for consumables.

FIG. 2 shows a modification of the waste disposal system (1) depicted in FIG. 1. Instead of the second lamella annulus (8'), what is provided is a mesh tube (13) which closes the second opening (5). Apart from that, the waste disposal systems (1) as per FIG. 1 and FIG. 2 are similar in design.

Figure 3:
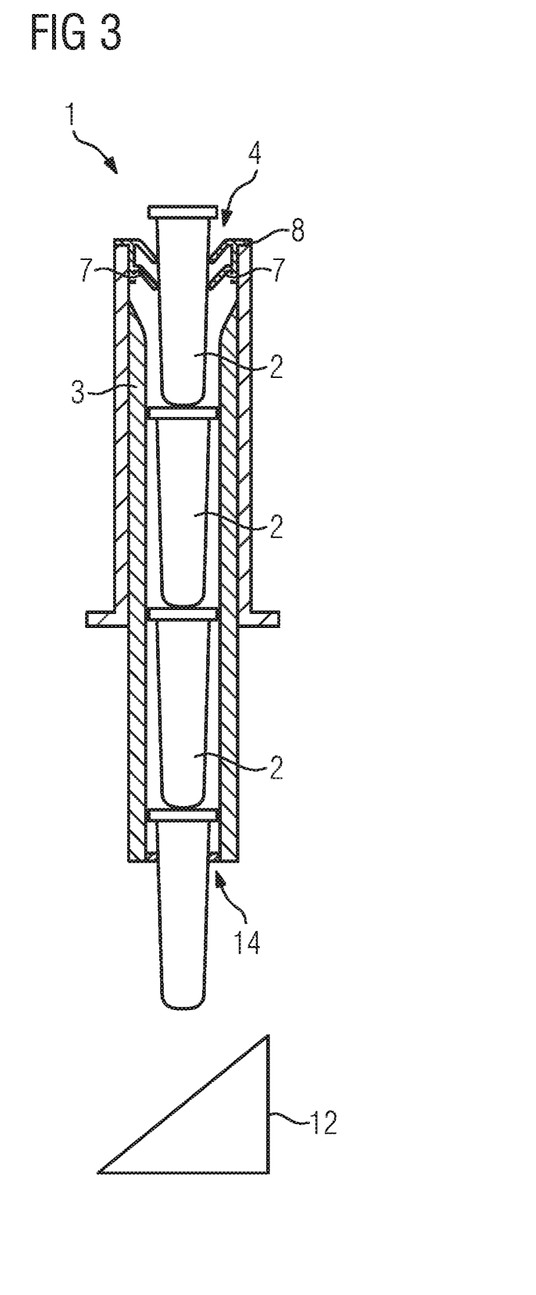
FIG. 3 shows schematically the structure of a waste disposal system (1) comprising a waste chute having a first lamella annulus and an elastic grommet as a brake for consumables.

FIG. 3 shows a further modification of the waste disposal system (1) depicted in FIG. 1. Instead of the second lamella annulus (8'), what is provided is an elastic grommet (14) which closes the second opening (5). The elastic grommet (14) can, in addition, vary in length in the direction of the waste chute. For example, a short ring, as depicted, can be concerned. Alternatively, the design can be similar to the mesh tube (13) depicted in FIG. 2 and be, for example, the length of a cuvette (2). Apart from that, the waste disposal systems (1) as per FIG. 1 and FIG. 3 are similar in design.

Figure 4:
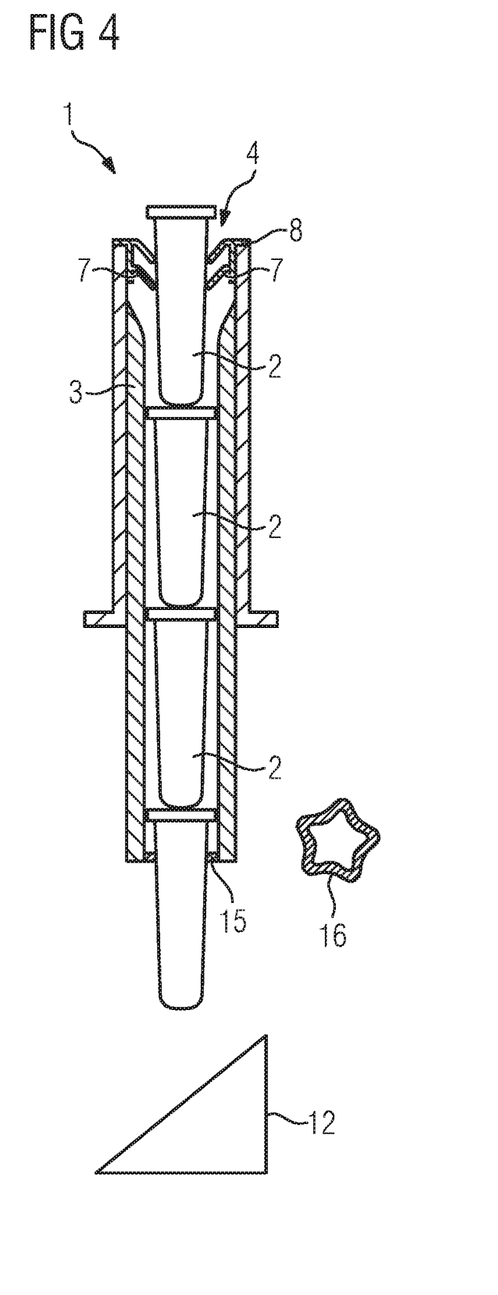
FIG. 4 shows schematically the structure of a waste disposal system (1) comprising a waste chute having a first lamella annulus and a star tube as a brake for consumables.

FIG. 4 shows a further modification of the waste disposal system (1) depicted in FIG. 1. Instead of the second lamella annulus (8'), what is provided is a star tube (15) which closes the second opening (5). The cross section (16) of the star tube (15) is pentamerous. The star tube (15) can, in addition, vary in length in the direction of the waste chute. For example, a short ring, as depicted, can be concerned. Alternatively, the design can be similar to the mesh tube (13) depicted in FIG. 2 and be, for example, the length of a cuvette (2). Apart from that, the waste disposal systems (1) as per FIG. 1 and FIG. 4 are similar in design.

Figure 5:
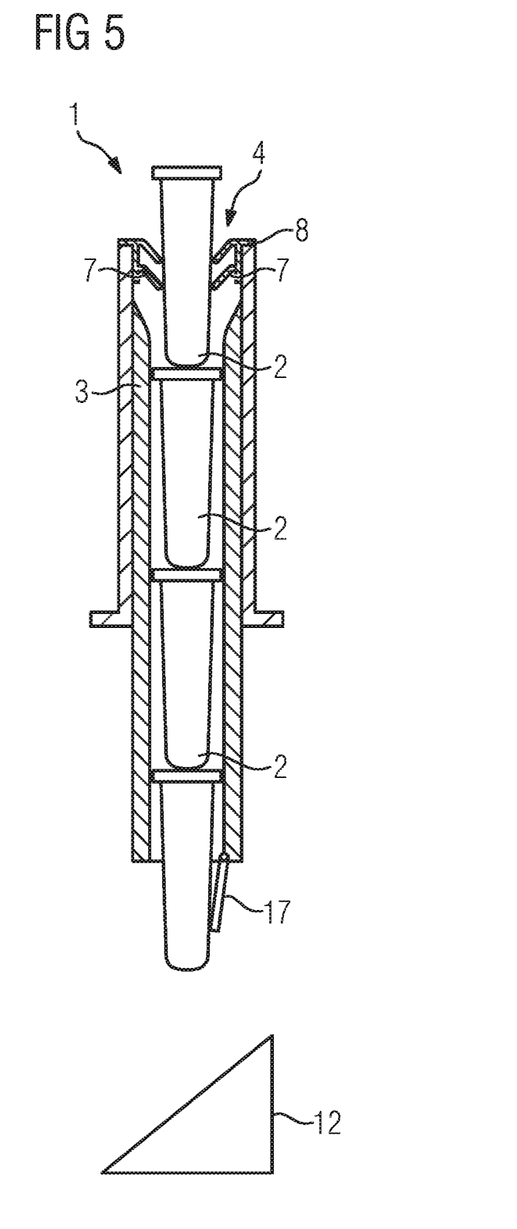
FIGS. 5 and 6 show schematically the structure of a waste disposal system (1) comprising a waste chute having a first lamella annulus and a self-closing flap as a brake for consumables.
Figure 6:
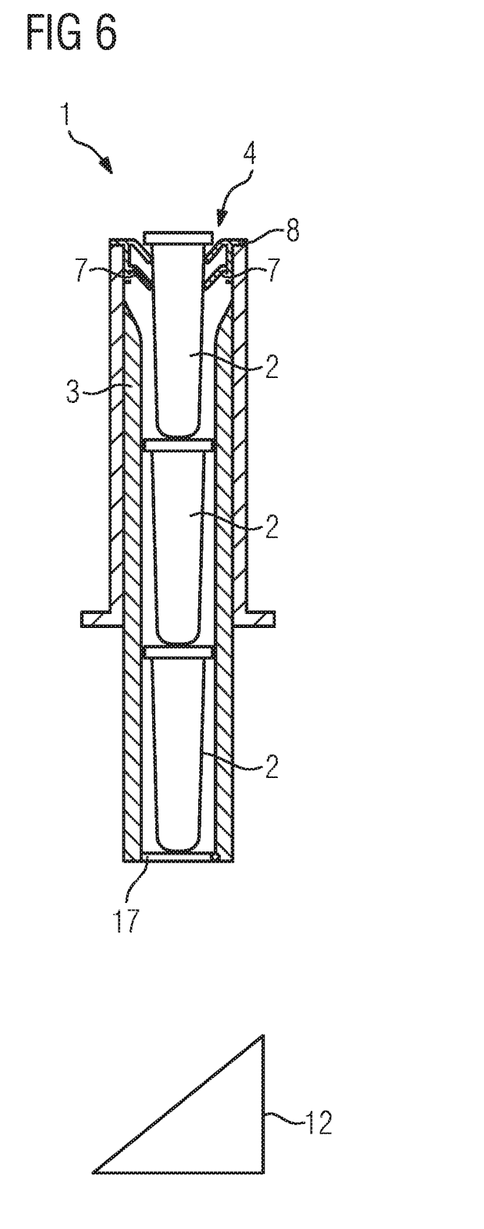

FIGS. 5 and 6 show a further modification of the waste disposal system (1) depicted in FIG. 1. Instead of the second lamella annulus (8'), what is provided is a flap (17) which closes the second opening (5). The flap (17) comprises a living hinge and is designed as a self-closing flap (17). In FIG. 5, the flap (17) is open, and in FIG. 6, it is closed. The flap (17) makes it possible to influence the direction of falling of the cuvette (2) through the orientation of the flap (17), since the opened flap (17) (see FIG. 5) deflects the cuvette (2) laterally. Apart from that, the waste disposal systems (1) as per FIG. 1 and FIG. 5/FIG. 6 are similar in design.

Figure 7:
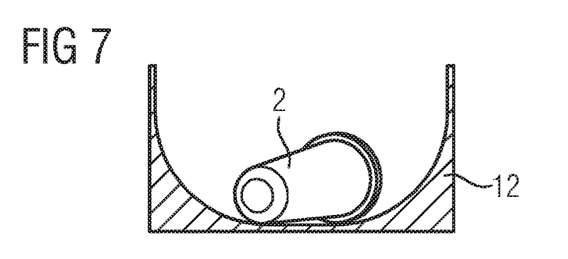
FIGS. 7 to 9 show schematically the design of the ramp for the diversion of consumables in various views.
Figure 8:
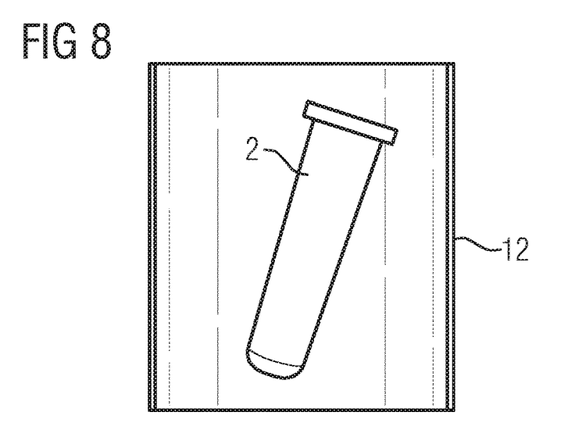
Figure 9:
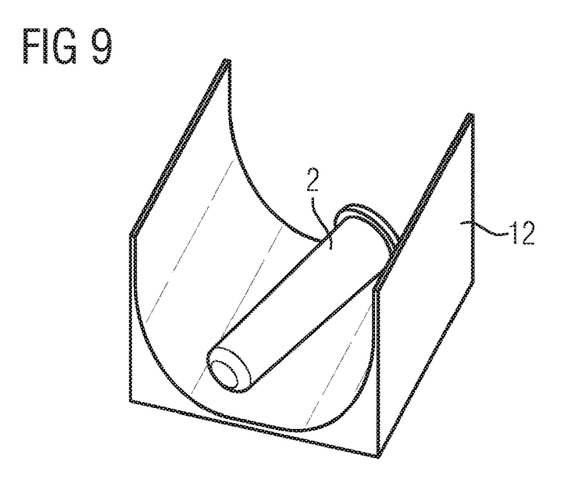

FIGS. 7 to 9 show the design of the ramp (12) for the diversion of consumables in various views, wherein FIG. 7 shows the ramp (12) in section, FIG. 8 shows the ramp (12) from above and FIG. 9 shows the ramp (12) from diagonally above. Situated on the ramp (12) is a cuvette (2).

The shape of the ramp (12) can have an influence on the occurrence of splashes. For example, if the cross section of the ramp (12) is substantially rectangular with rounded corners, with the total inner width of the ramp cross section being greater than the length of the cuvette (2), a transverse positioning or rotation of the cuvette (2) on the ramp (12) is possible, and this can lead to the escape of liquid from the cuvette.

Therefore, according to the invention, the ramp cross section is presently designed such that the corners are rounded with a relatively large radius and that the total width is reduced by sloping sidewalls. What is achieved is that, firstly, the cuvettes (2) have sufficient movement clearance for reducing motion energy present after falling due to rolling and wobbling movements, but, secondly, the movement clearance is restricted to the extent that tipping or rotating movements of the cuvette (2), which can lead to liquid loss, are minimized. Furthermore, straight surfaces or surfaces with which the cuvette (2) can collide are avoided.

LIST OF REFERENCE SIGNS 1 waste disposal system
2 cuvette
3 waste chute
4 first opening
5 second opening
6 first distance
7 lamellae
8, 8' lamella annulus
9 second distance
10 first inner diameter
11 second inner diameter
12 ramp
13 mesh tube
14 elastic grommet
15 star tube
16 cross section
17 flap

The invention claimed is:

1. A waste disposal system for the disposal of consumables through a waste chute into a waste container, the waste disposal system comprising a waste chute having a first opening and a second opening, wherein the first opening is situated outside the waste container and the second opening opens toward the waste container, wherein the first opening and the second opening are arranged at a first distance from one another, wherein the waste chute comprises a plurality of self-resetting lamellae for the partial or complete closure of the first and second openings, wherein the lamellae form at least one first lamella annulus and one second lamella annulus, wherein the first lamella annulus and the second lamella annulus are arranged at a second distance above one another, wherein at least the first lamella annulus closes the first opening and wherein at least the second lamella annulus closes the second opening, wherein the second distance between the first lamella annulus and the second lamella annulus is at least one third of the first distance, and wherein the waste chute has a first inner diameter in a respective region of the first and the second lamella annuli and has a second inner diameter extending continuously for most of the second distance in a region between the first lamella annulus and the second lamella annulus, the second inner diameter smaller than the first inner diameter.

2. The waste disposal system as claimed in claim 1, wherein no lamellae and/or lamella annuli are arranged between the first lamella annulus and the second lamella annulus.

3. The waste disposal system as claimed in claim 1, further comprising a ramp for the diversion of consumables, wherein the ramp is arranged below the second opening such that consumables falling through the second opening into the waste container fall onto the ramp and are diverted thereby.

4. The waste disposal system as claimed in claim 3, wherein the ramp comprises sidewalls and is rectangular in its cross section with rounded corners and sloping sidewalls.

5. The waste disposal system as claimed in claim 1, wherein the consumables are cuvettes or pipette tips.

6. The waste disposal system as claimed in claim 1, wherein the lamellae consist of an elastic material or are connected elastically to the waste chute.

7. The waste disposal system as claimed in claim 1, wherein the lamellae consist of plastic, rubber or metal.

8. The waste disposal system as claimed in claim 1, wherein the lamellae are separably connected to the waste chute.

9. The waste disposal system as claimed in claim 1, wherein the lamellae form a lamella insert.

10. The waste disposal system as claimed in claim 1, wherein an opening mechanism for a cuvette gripper is attached to the waste chute, wherein the opening mechanism comprises a structure which is similar in shape to a prism having a triangle as base and top surface.

11. The waste disposal system as claimed in claim 1, wherein the second distance between the first lamella annulus and the second lamella annulus is at least half of the first distance.

12. The waste disposal system as claimed in claim 1, wherein the second distance between the first lamella annulus and the second lamella annulus is at least three quarters of the first distance.

13. An automatic analytical instrument comprising a waste disposal system as claimed in claim 1, wherein the automatic analytical instrument further comprises a cuvette gripper and at least one measurement device for the optical or electronic quantitative detection of at least one analyte in a sample.

14. A waste disposal system for the disposal of consumables through a waste chute into a waste container, the waste disposal system comprising:
a waste chute having a first opening and a second opening, wherein the first opening is situated outside the waste container, and the second opening opens toward the waste container, wherein the first opening and the second opening are arranged at a first distance from one another, wherein the waste chute comprises a plurality of self-resetting lamellae for the partial or complete closure of the first opening, wherein the lamellae form at least one first lamella annulus, wherein the first lamella annulus and the second opening are arranged at a second distance above one another and the second distance is at least one third of the first distance, and wherein the waste chute has a first inner diameter in a region of the first lamella annuli and has a second inner diameter extending continuously for most of the second distance in a region between the first lamella annulus and the second opening, the second inner diameter smaller than the first inner diameter; and
a tube having a first and a second end, wherein the first end of the tube is attached to the waste chute in a region of the second opening and wherein the second end is situated within the waste container.

15. The waste disposal system as claimed in claim 14, wherein the tube is a mesh tube, an elastic grommet or a star tube.

16. A waste disposal system for the disposal of consumables through a waste chute into a waste container, the waste disposal system comprising:
a waste chute having a first opening and a second opening, wherein the first opening is situated outside the waste container, and the second opening opens toward the waste container, wherein the first opening and the second opening are arranged at a first distance from one another, wherein the waste chute comprises a plurality of self-resetting lamellae for the partial or complete closure of the first opening, wherein the lamellae form at least one first lamella annulus, wherein the first lamella annulus and the second opening are arranged at a second distance above one another and the second distance is at least one third of the first distance, and wherein the waste chute has a first inner diameter in a region of the first lamella annuli and has a second inner diameter extending continuously for most of the second distance in a region between the first lamella annulus and the second opening, the second inner diameter smaller than the first inner diameter; and
a self-closing flap comprising a living hinge, wherein the flap is attached to the waste chute in a region of the second opening and closes the second opening.

* * * * *